(12) United States Patent
Clark et al.

(10) Patent No.: US 8,606,661 B2
(45) Date of Patent: Dec. 10, 2013

(54) SYSTEM SUPPORTING AUTOMATED CLEARING HOUSE (ACH) FEATURES

(75) Inventors: Greg Clark, Maryville, IL (US); David Divers, Beaverdam, VA (US); Mike Fabian, Uxbridge, MA (US); Rick Forbis, Howe, TX (US); Robin W. Glowski, Murphy, TX (US); Terry Lewis, Alexis, NC (US); Keith Loving, Chesterfield, NC (US); Dave Mauney, Charlotte, NC (US); Jennifer Ona, Andover, MA (US); Dawn Patton, Matthews, NC (US); Cheryl Robinson, Doraville, GA (US); Patricia A. Stewart, Chino Valley, AZ (US)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 12/414,200

(22) Filed: Mar. 30, 2009

(65) Prior Publication Data

US 2010/0250406 A1    Sep. 30, 2010

(51) Int. Cl.
   *G07B 17/00*    (2006.01)
   *G07F 19/00*    (2006.01)

(52) U.S. Cl.
   USPC ............................................................ 705/30

(58) Field of Classification Search
   None
   See application file for complete search history.

(56) References Cited

U.S. PATENT DOCUMENTS

| 7,499,875 B1 | 3/2009 | May et al. |
| 7,505,937 B2 | 3/2009 | Dillip et al. |
| 2005/0086136 A1* | 4/2005 | Love et al. ...................... 705/30 |
| 2010/0312705 A1* | 12/2010 | Caruso et al. ................... 705/45 |

OTHER PUBLICATIONS

European Search Report from related EP Application No. 10 25 0660 mailed Nov. 9, 2010, pp. 1-2.
Office Action, Mexican Patent Office, Mexican Patent Application No. MX/a/2010/003580, Jul. 9, 2012, 6 pages.
Office Action, Mexican Patent Office, Mexican Patent Application No. MX/a/2010/003580, Mar. 4, 2013, 5 pages.

* cited by examiner

*Primary Examiner* — Paul Danneman
(74) *Attorney, Agent, or Firm* — Banner & Witcoff, Ltd.; Michael A. Springs (57) ABSTRACT

Techniques for supporting an automated clearing house system (ACH) for facilitating resolution of ACH transactions. When a transaction item is blocked for an account, the associated transaction is paused so that the transaction item can be presented to the client. When the indication from the client is indicative of accepting the transaction item, the transaction is allowed to process. When the indication is indicative of returning the transaction item, the transaction is stopped and the transaction item is returned. On-line authorization maintenance information may be received from the client so that transaction items can be processed based on the on-line authorization maintenance information, which may be used edit a current authorization entry or to create a new authorization entry for a trading partner. A decision to approve a blocked transaction item may be decided by an employee of a client. However, approval may further require approval by a second employee.

36 Claims, 8 Drawing Sheets

SYSTEM SUPPORTING AUTOMATED CLEARING HOUSE (ACH) FEATURES

FIELD

Aspects of the invention generally relate to financial transactions. In particular, features for an automated clearing house (ACH) system are supported.

BACKGROUND

Automated Clearing House (ACH) is an electronic network for financial transactions in the United States. An ACH typically processes large volumes of both credit and debit transactions that are originated in batches, in which rules and regulations governing the ACH network are established by the Electronic Payments Association (formerly the National Automated Clearing House Association (NACHA)) and the Federal Reserve (the Fed). In 2002, the ACH network processed an estimated 8.05 billion ACH transactions with a total value of $21.7 trillion.

In accordance with the rules and regulations of ACH, no financial institution may simply issue an ACH transaction (debit or credit) towards an account without prior authorization from the account holder (often referred as the receiver). An ACH entry starts with a receiver authorizing an originator to issue ACH debit or credit to an account. An originator can be a person or a company (such as the gas company, a local cable company, or one's employer). Depending on the ACH transaction, the originator typically must receive written, verbal, or electronic authorization from the receiver.

Once authorization is acquired, the originator then creates an ACH entry that is presented to an originating depository financial institution (e.g., the originator's bank). The ACH entry is then sent to an ACH operator (often the Fed). The ACH entry is then passed on to the receiving depository financial institution (e.g., the receiver's bank), in which the receiver's account is issued either as a credit or debit depending on the ACH transaction. However, the receiving depository financial institution may reject the ACH transaction and return the ACH transaction to the originating depository financial institution. For example, the receiver's account may have insufficient funds or the account holder may have indicated that the transaction was unauthorized. An originating depository financial institution may re-present the ACH entry several times for settlement. However, the receiving depository financial institution may again reject the transaction.

BRIEF SUMMARY

The present disclosure addresses one or more of the issues mentioned above by disclosing methods, computer readable media, and apparatuses for supporting an automated clearing house system (ACH) for facilitating resolution of ACH transactions.

With another aspect of the invention, when a transaction item is blocked for an account, the associated transaction is paused so that the transaction item can be presented to the client. In response, an indication is subsequently received from the client. When the indication is indicative of accepting the transaction item, the transaction is allowed to process. When the indication is indicative of returning the transaction item, the transaction is stopped and the transaction item is returned.

With another aspect of the invention, on-line authorization maintenance information is received from the client so that transaction items can be processed based on the on-line authorization maintenance information. On-line authorization maintenance information may be used edit a current authorization entry or to create a new authorization entry for a trading partner.

With another aspect of the invention, a decision to approve a blocked transaction item may be decided by an employee of a client. However, approval may further require approval by a second employee.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the invention, methods, computer-readable media, and apparatuses are disclosed in which a data warehouse combines different software tools (tools) and connects multiple disparate systems to provide a fall view of the data warehouse for an end user.

Figure 1:
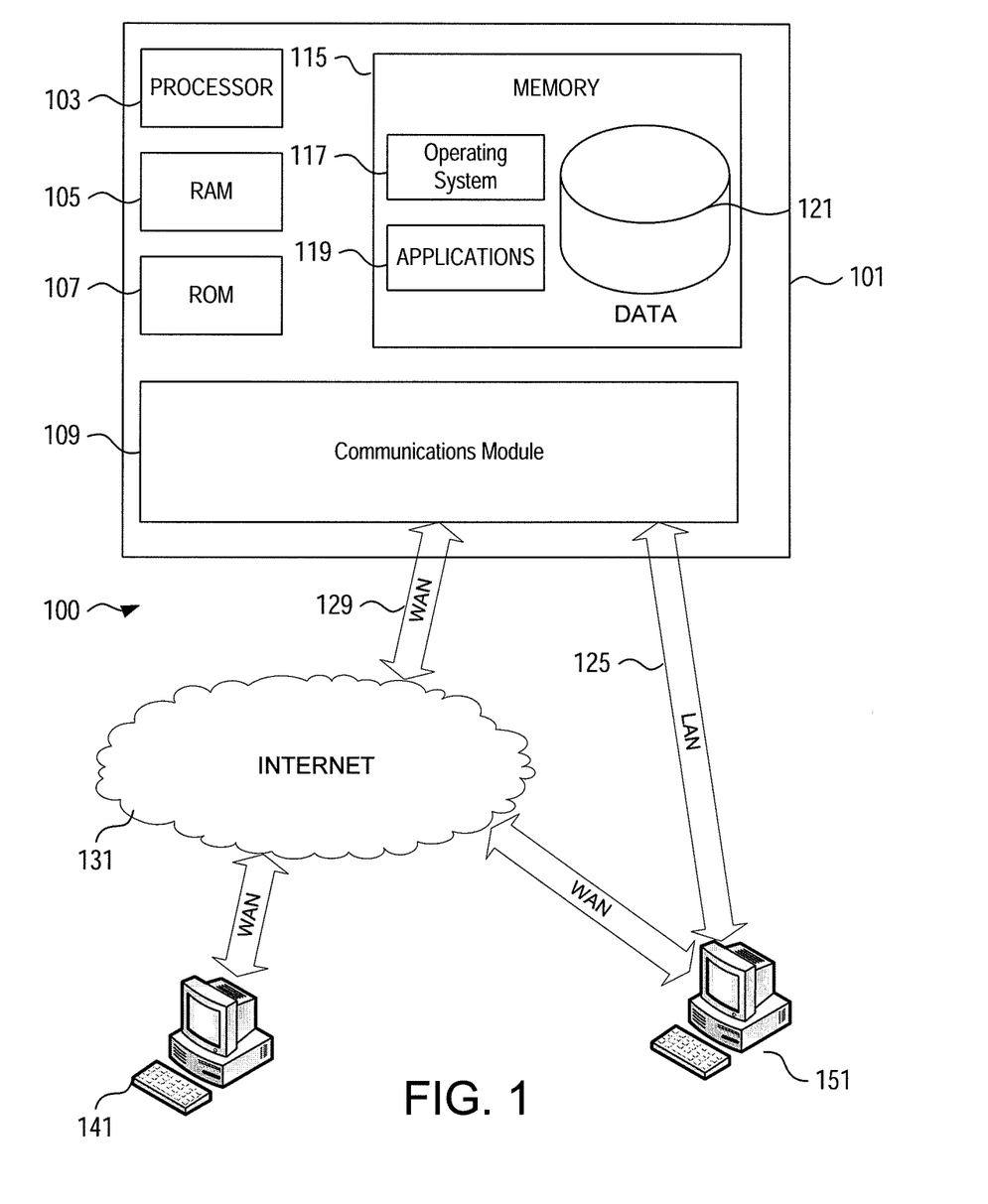
FIG. 1 shows an illustrative operating environment in which various aspects of the invention may be implemented.
Figure 5:
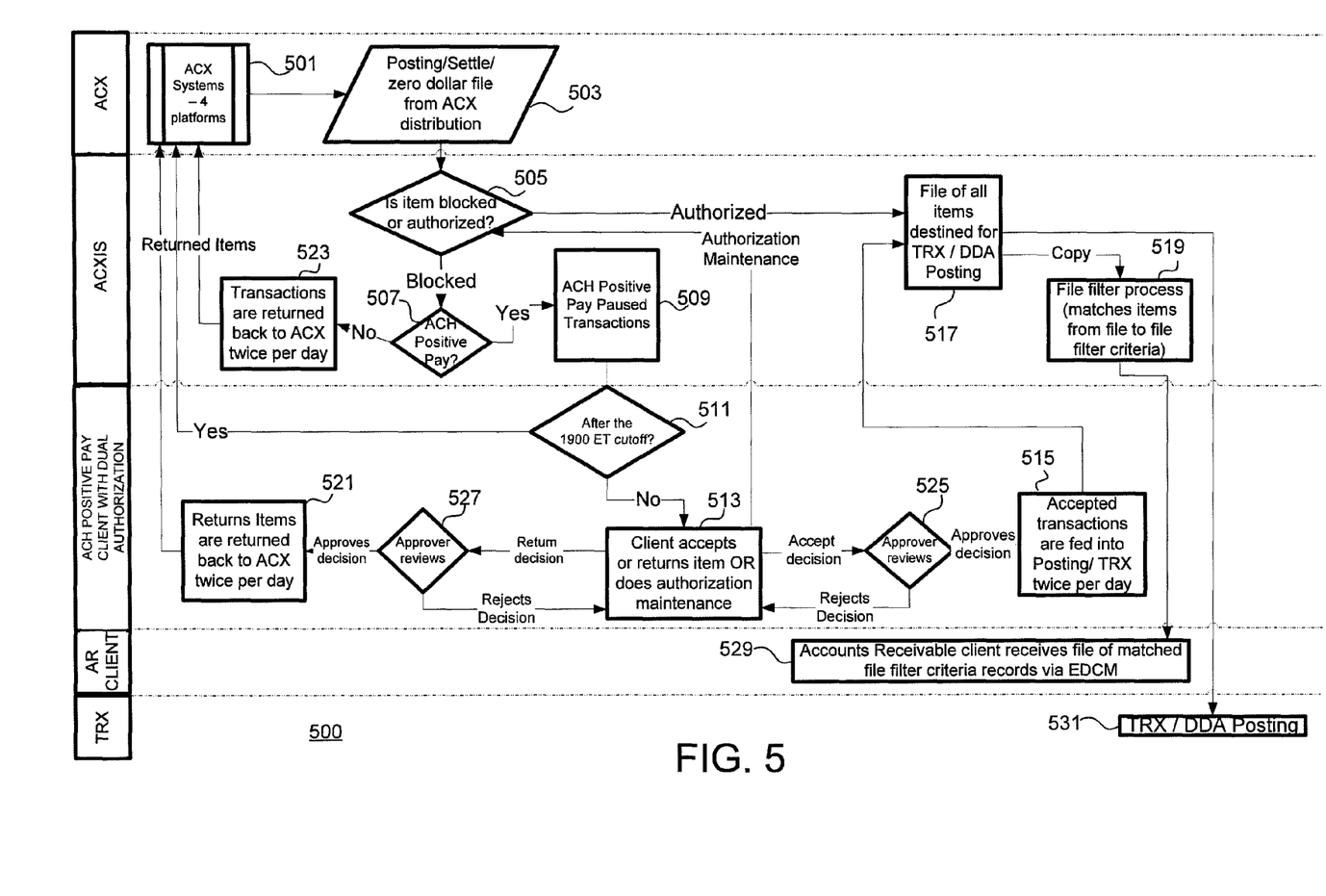
FIG. 5 shows a flow diagram for an ACH positive pay feature with dual authorization in accordance with an aspect of the invention.

FIG. 1 illustrates an example of a suitable computing system environment 100 (e.g., data warehouse system 500 as shown in FIG. 5) that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise and combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of pre-clearance information or trading information for security equities in different jurisdictions.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
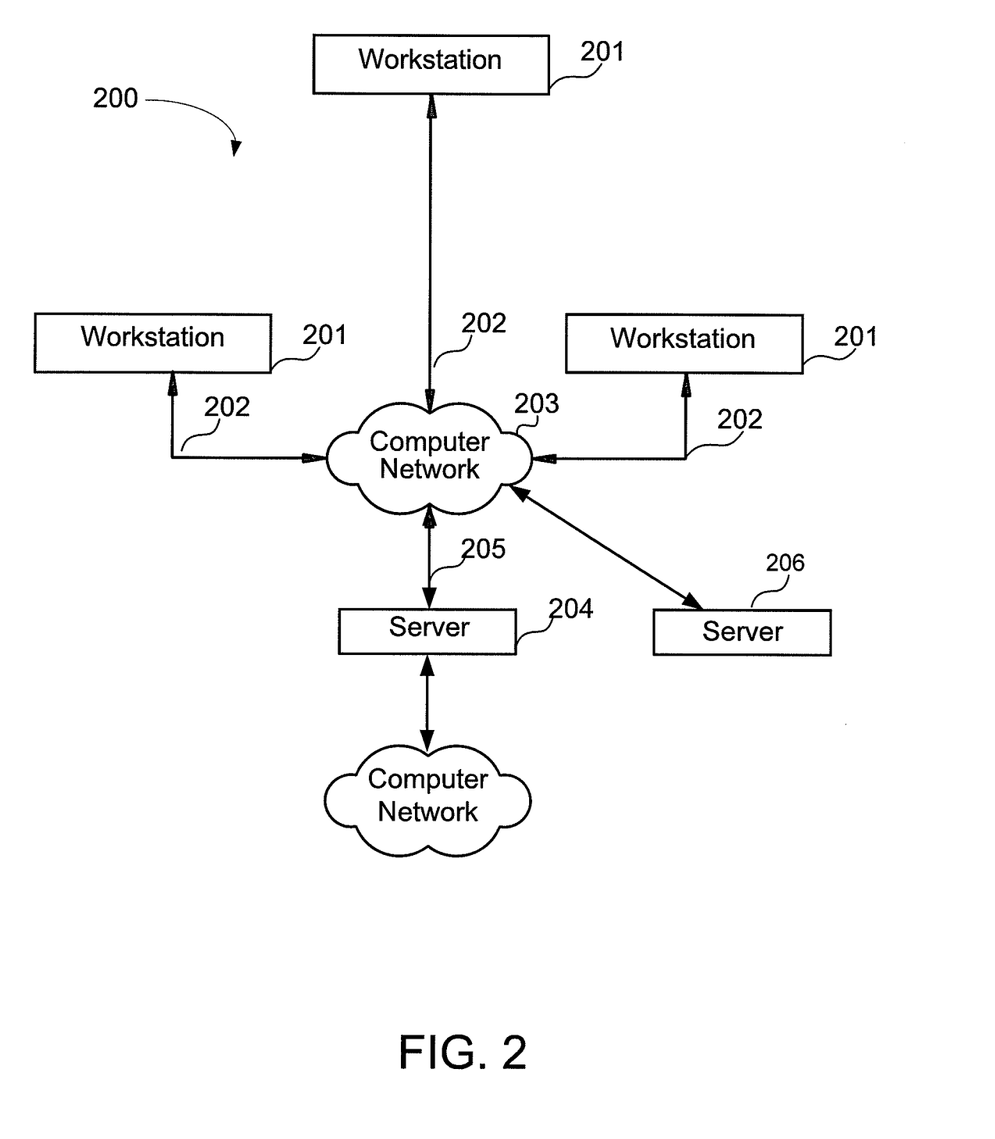
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

System 200 may include a mainframe computer (not shown) and/or a plurality of servers (e.g., server 204 and server 206), where each server may provide different services to a user.

As understood by those skilled in the art, the steps that follow in the Figures may be implemented by one or more of the components in FIGS. 1 and 2 and/or other components, including other computing devices. With an aspect of the invention, systems 100 or 200 may support an automated clearing house (ACH) system, which may be described as a computing system that is used to support ACH features for processing ACH transactions. For example, system 100 or 200 may perform processes 300, 400, 500, and 700 (as shown in FIGS. 3, 4, 5, and 7, respectively) as will be further discussed.

Figure 3:
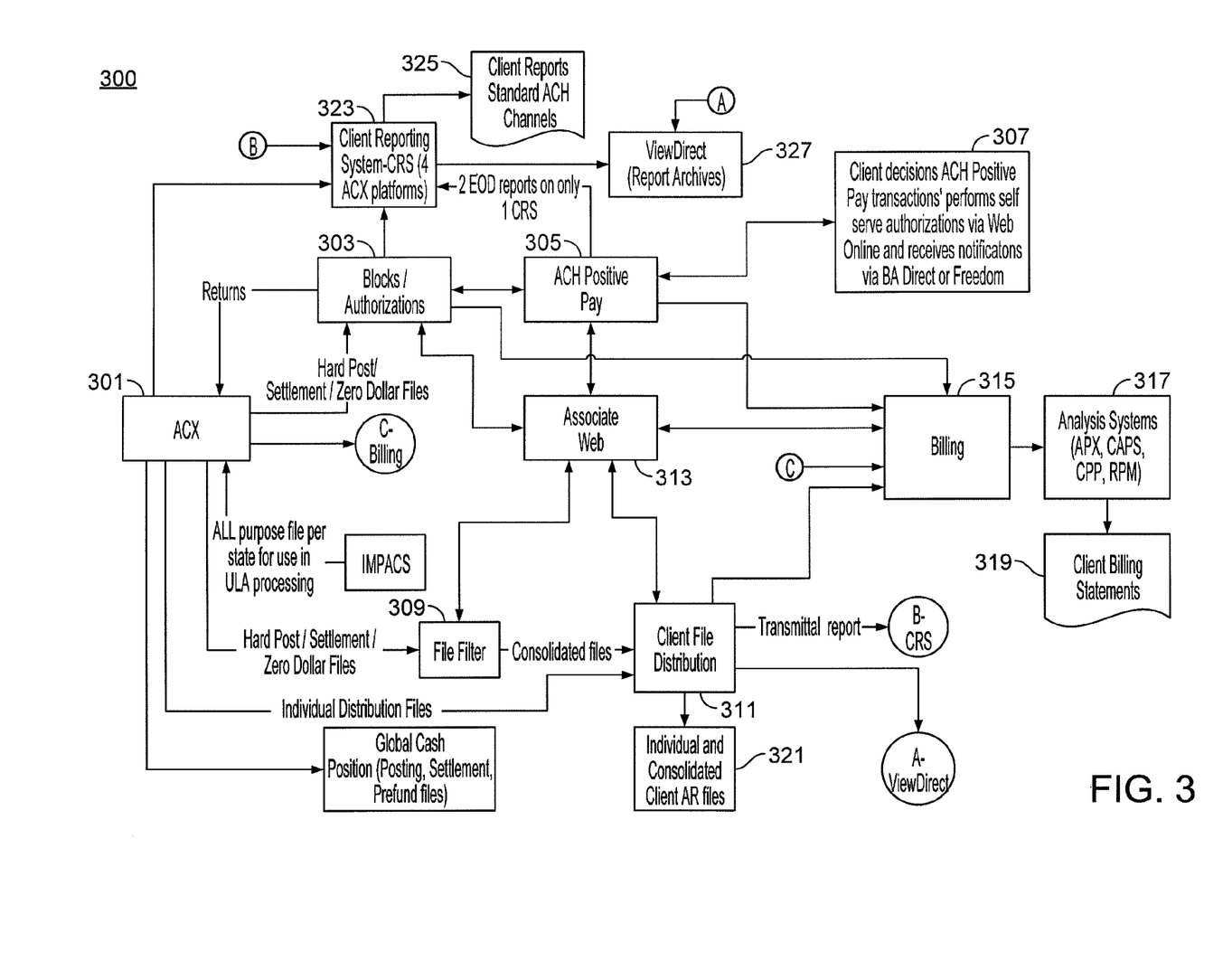
FIG. 3 shows a block diagram of an automated clearing house (ACH) system in accordance with an aspect of the invention.

FIG. 3 shows block diagram of an automated clearing house (ACH) system 300 in accordance with an aspect of the invention. ACH system 300 may be referred as the "ACXIS" system although the system name is for identification purposes and does not convey a descriptive connotation.

ACXIS system 300 interfaces with a base ACX platform 301 for transaction processing. ACXIS system 300 takes a feed from a base ACH platform 301 and then processes the feed by different ACH features including ACH Positive Pay 305, Blocks/Authorizations 303, File Filter 309, and EDCM (Electronic Distribution Control Master) 311 for client file distribution. FIG. 3 shows how the client may have a selection of two systems to access the ACH Positive Pay feature 305, how reports are distributed, and how billing is captured. With some embodiments, features may execute one each platform or may execute on a centralized processor. For example, features 303 and 309 may run on every platform while features 305 and 311 are centrally executed.

ACXIS system 300 may comprise a plurality of ACH platforms on which a client may be supported. With some embodiments, clients are assigned to one of the platforms based on the region that the client is located (e.g., North, South, East, or West) and/or transaction volume in order to balance the throughput of the systems. ACXIS system 300 provides a single on-line view through Associate Web 313 into information from four ACX platforms on four different LPARs (Logical PARtition corresponding to the physical mainframe system running a specific ACX processing system that is servicing specific states) for banking associates. With some embodiments, an ACH platform is a software platform, where the plurality of ACH platforms resides on a common computer system or on different computer systems.

With some embodiments, ACXIS system 300 has the capability of handling ACH growth as well as supports the ACH industry's adoption of converting checks to electronic items. With the shift from paper to electronic formats, some forecasts suggest that ACH volumes will grow three times the current level (the year 2009) within the next three years.

Figure 6:
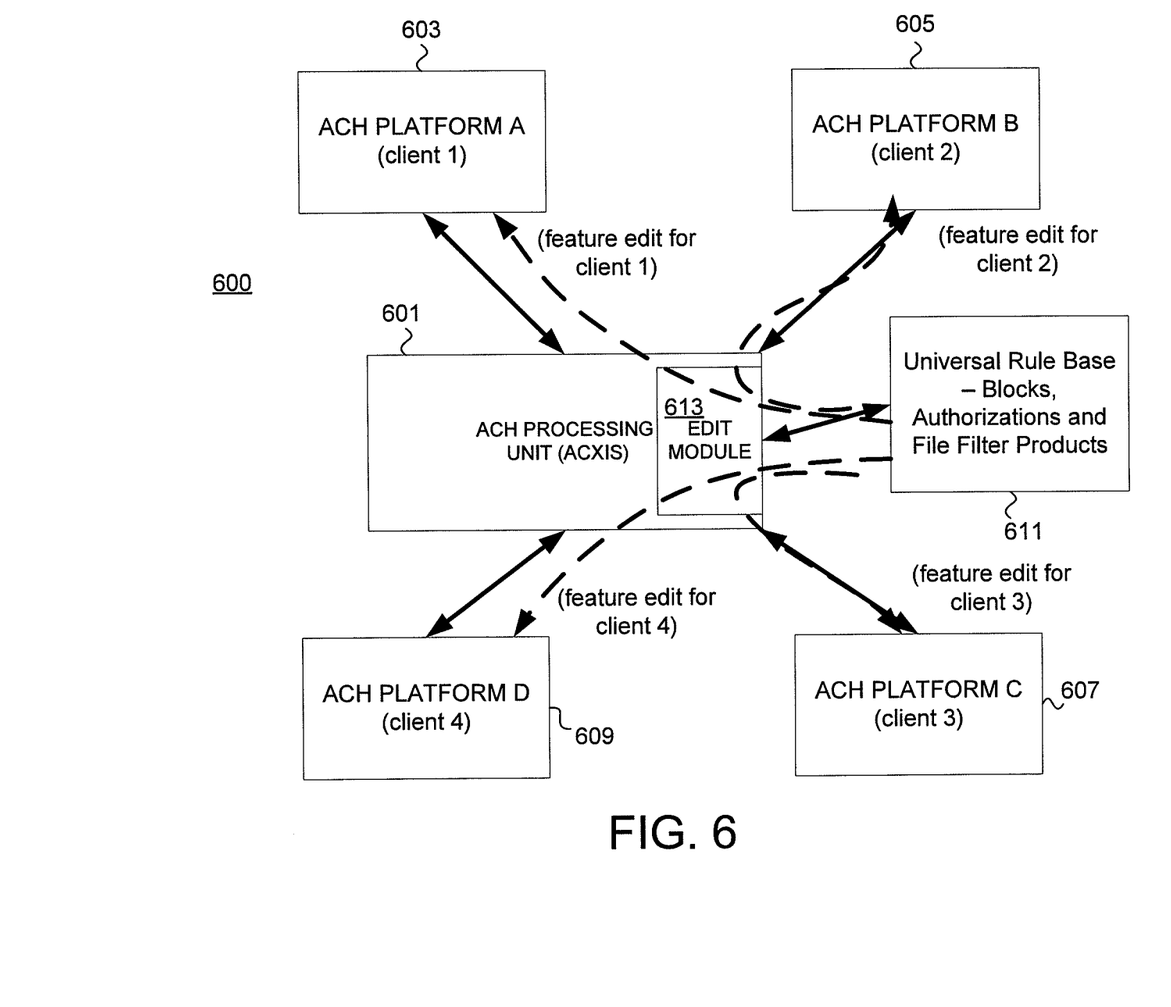
FIG. 6 shows a block diagram of an ACH system with multiple platforms for clients with accounts only on one platform in accordance with an aspect of the invention.

With traditional ACH systems, each ACH platform has its own set of "in-house account editing rules," which includes client requests to block/stop and filter electronic payments that are destined for their accounts. ACXIS system 300 provides a common set of client/account instructions and site (e.g., platform) specific processing rules with a single source look and feel from a user's (e.g., banking associate's) perspective through a common interface (e.g., associate web 313 or configuration interface 611 as shown in FIG. 6) while allowing the required time to reach the target end state. Consolidating editing rules in a central module (e.g., associate web 313) facilitates consistent support over the ACH platforms as well as provides an ability to provide more on-line real time edit checking, thus enhancing the quality of maintenance for ACH features.

Associate web 313 is an on-line web-based capability of banking associates. Associate web 313 provides a single source for banking associates to maintain client information that may be replicated on all ACH platforms. Additional on-line editing may be added to enhance the quality of the maintenance for blocks and authorizations (which may be used for either ACH Positive Pay feature 305 or for Blocks/Authorizations feature 303), file filter feature 309, and EDCM feature 311.

Figure 4:
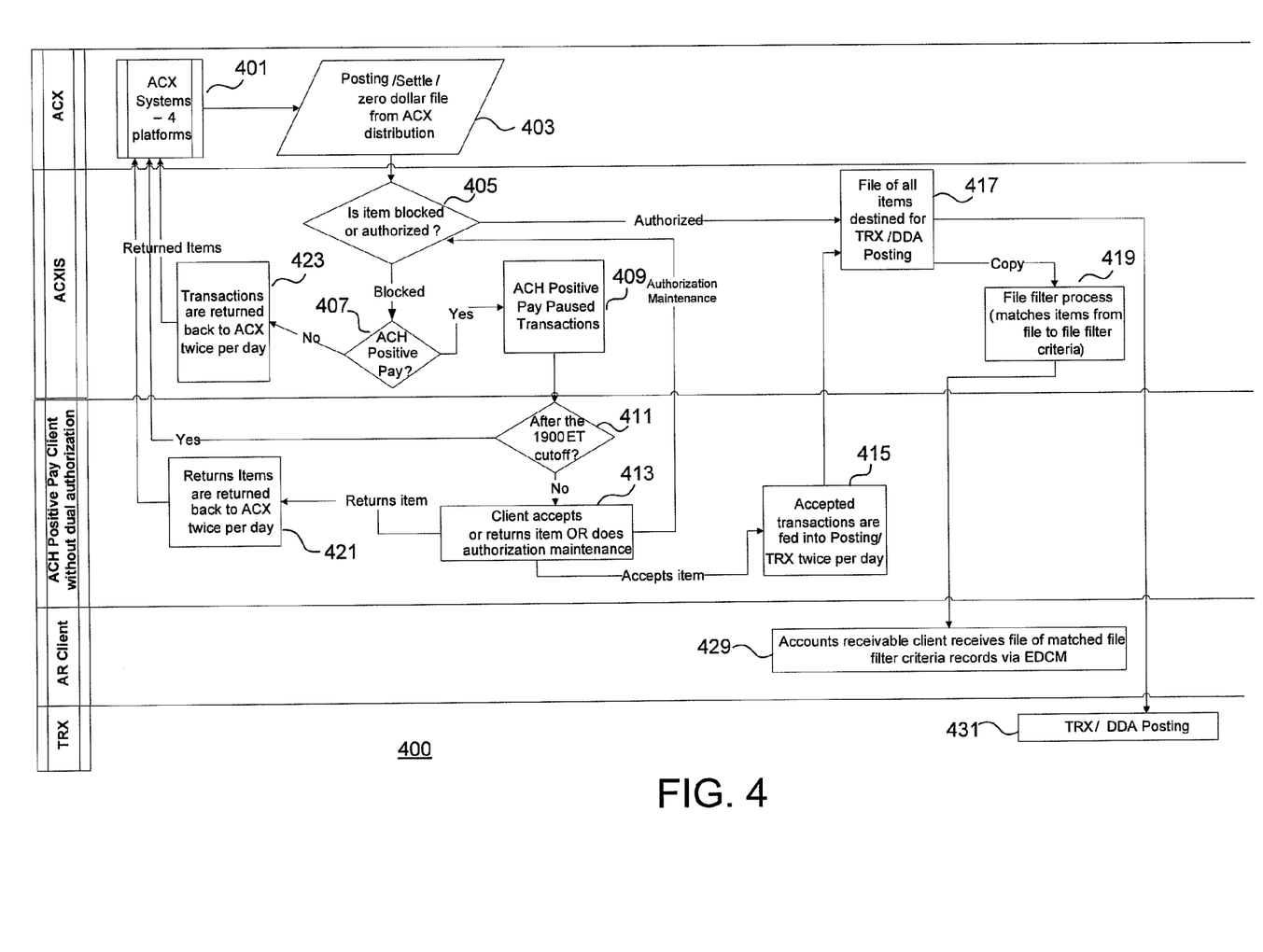
FIG. 4 shows a flow diagram for an ACH positive pay feature without dual authorization in accordance with an aspect of the invention.

ACH Positive Pay feature 305 offers a client the ability to decision unauthorized transactions on a daily basis as will be further discussed in FIGS. 4 and 5. Clients can decide whether to pay or return the unauthorized transaction. Transactions may also be reported in an exceptions report within the ACH positive pay module by the client accessing the module through a banking portal 307. The client has the option of approving unauthorized transactions, adding/modifying an authorization that would allow future transactions from the trading partner to be authorized, or returning the transaction item.

With some embodiments, an additional security capability of ACH Positive Pay feature 305 requires that the paused transaction decision have dual authorization as further discussed in FIG. 5. The first employee can indicate their decisions for the paused transactions. A second employee can review those decisions and indicate if the transactions are approved or rejected. Approved transactions are then sent to the bank for processing. Rejected transactions are returned to the paused transaction decision queue so that the rejected transactions can be decisioned again.

With ACH Positive Pay feature 305, making decisions for the paused transactions and approving those decisions may be done within a predetermined time interval, e.g., between 7 am ET and 7 pm ET. As an example, the client may be able to begin making decisions before 7 am ET; however, a service level agreement may state that the feature must available by 7 am. Continuing the example, ACXIS system 300 does not allow decisions to be made after 7 pm ET. Transactions left in the paused transaction queue or transactions that are received by the bank after the 7 pm ET cutoff are returned. No transactions are held over for the next business day.

The client is also able to add, change or delete authorizations with ACH Positive Pay feature 305. Consequently, the client is able to approve transactions for processing without the transactions being presented in the paused transaction queue. This approach typically saves time for the client since the client knows that these transactions don't require decisions. However, for transactions that require a decision, a notification is sent to the client indicating there are paused transactions that need to be decisioned.

The client may elect to fill out the necessary forms when ordering ACH Positive Pay feature 305. In such a case, the client may be required to indicate what type of block options the client wants for the account, what authorizations the client would like added up front, how the client would like to receive the end of day report that is required for the client to receive, if the client would like to receive the optional report and how the client would like to receive it, if the client would like the optional feature of dual authorization for paused transactions, and if the client would like the optional method to receive notifications.

With some embodiments, the client is able to block transaction items based on a debit level rather than on a transaction code level. Consequently, blocks do not need to be separately configured for different types of accounts, e.g., savings account and demand deposit account (DDA).

When the above information has been received, a banking associate sets up the client's account for ACH Positive Pay feature 305. This entitles the client (company) administrator to assign access to ACH Positive Pay feature 305 for the client's employees. The client administrator then makes the assignments for the client. A banking associate then sets up ACH Positive Pay feature 305 through associate web 313. When configuring feature 305, a block (for blocking a transaction) is established using at different generic block options. An ACH positive pay flag is then turned on within ACXIS system 300 in order to activate feature 305 for the client. Authorizations may also be set up at this time if the authorization capability has have been selected by the client. Feature 303 may create the data to be viewed by feature 303. The delivery method for reports is set up in the Client Report System (CRS) 323 through client reports standard ACH channels 325 and report archives 327.

Once ACH Positive Pay feature 305 has been configured, the client begins to decision paused transactions. If the client signed up for the notification service, the client will receive a notification that there are transactions that need to be decisioned. Decisioned transactions are processed per the instructions received from the client, in which the transactions are either sent downstream for processing or are returned. Continuing the previous example, on-line system 300 will stop allowing decisions to be posted for paused transactions at 7 pm ET. All paused transactions that were not decisioned or were received after the cutoff are returned.

End of day processing generate two reports for the client. The first report is always sent to the client. The second report is optional. The reports are delivered based on the client requirements which were established in CRS 323. Transactions for the next business day are available to the client as soon as all end of day processing has been completed on the ACH platforms. The client can then begin to add, change or delete authorizations on-line.

The blocks service may be used by ACH Positive Pay feature 305 or Blocks/Authorizations feature 303 for specific accounts. With some embodiments, there are five options that may be selected. Three are called generic blocks: all debits, all credits, or both. Generic blocks pertain to all incoming transactions. Specific block options are for SEC (Security and Exchange Commission) code and company ID and reversals on incoming transactions. The SEC code option is to block one SEC code, all SEC codes, or a selection of the possible SEC codes. The company ID is to block a specific trading partner, where all transactions from that company ID are blocked. The client has the ability to choose up to six specific blocks for their accounts.

The authorizations service also may be used by ACH Positive Pay feature 305 or Blocks/Authorization feature 303 for specific company IDs on incoming transactions. With some embodiments, there are six options that may be selected: all credits, a specific credit amount, up to a maximum credit amount, all debits, a specific debit amount, and up to a maximum debit amount. There may be multiple authorizations for specific debit or credit amounts. There may be no limit to the number of authorizations that can be placed for a specific account.

Some clients may use Blocks/Authorizations feature 303 rather than ACH Positive Pay feature 305. Although ACH Positive Pay feature 305 provides on-line decisioning while Blocks/Authorizations feature 303 does not, both features share common aspects. The client may elect Blocks/Authorizations 303 by filling forms that include what type of block options the client wants for the account, what authorizations the client would like added up front, how the client would like to receive the end of day report that is required for the client to receive, and if the client would like to receive the optional report and how the client would like to receive it. A banking associate configures feature 303 so that the feature can be activated. However, a client needs to submit forms to add, change, or delete authorizations.

File Filter feature 309 and EDCM feature 311 typically execute together. Features 309 and 311 are used to create and deliver files to an account receivables client. File Filter feature 309 allows the client to capture specific transactions on a daily basis and create a file of these transactions. The options to capture specific transactions include: by company ID, by SEC code, by transaction type, by transaction code, by consumer, or corporate transaction type. There is also a pre-note option, which is an option to include settlement entries, to include trace numbers, and/or include miscellaneous notes. EDCM feature 311 delivers the file to the client based on their specific requirements.

In order to configure feature 309 and 311, the client may fill out forms that indicate what criteria to use to pull transactions, how often to deliver the file and at what time of day, and how to deliver the file either by a tool for transferring files between different hardware platforms (e.g., Network Data Mover (NDM)) or by transmission. A banking associate may then set up the parameters through associate web 313 to capture specific transactions (which are associated with File Filter feature 309). portion of the product. Then using the EDCM feature, the banking associate sets up the file specifics, including how often to create the file each day and how to deliver the files (NDM or other transmission).

Filtered transaction items may be reported to the client through client file distribution 311 and stored as accounts receivable (AR) file 321. Transaction items may be "trapped" so that the transaction can be included in AR file 321 based on different criteria including:

1. account and transit routing numbers
2. account and transit numbers for all credits
3. account and transit numbers for all debits
4. account and transit numbers and company ID for all credits
5. account and transit numbers and company ID for all debits
6. account and transit numbers, company ID, and SEC code for all credits
7. account and transit numbers, company ID, and SEC code for all debits
8. copy all transaction items The client reporting system (CRS) 323 is a service that is enhanced to deliver the new reports as well as deliver reports which are consolidated for ACH platforms.

Billing 315 provides billing for ACH features 303 309, 311, and 305. With some embodiments, billing 305 is executed on a centralized processor and is universal.

FIG. 4 shows a flow diagram 400 for ACH Positive Pay feature 305 in accordance with an aspect of the invention. Flow diagram 400 corresponds to feature 305 without dual authorization for paused transactions (corresponding to step 409). ACH positive pay feature provides on-line customer (client) access to blocked positive pay transactions that have not yet been decisioned. The on-line customer submits pay and/or return instructions to the bank for processing within ACH operations (corresponding to step 413). The on-line customer also has the ability to inquire about exceptions that are pending and/or processed by the bank. In addition, the on-line customer may authorize transactions manually and maintain authorizations.

ACH Positive Pay feature 305 has the flexibility of processing exceptions and adding authorizations with or without dual approvals. Once an account is established with the ACH Positive Pay feature 305, only those items that meet authorization criteria are posted to the client's account. Unauthorized transactions are paused and presented on-line through ACH Positive Pay feature 305 so that the client can determine the desired handling (e.g., treatment) of the transaction item. The transactions that are presented to the client are defined as ACH positive pay exceptions.

Referring to FIG. 4, transaction items obtained from ACXIS system 300 through steps 401, 403, and 405. If a transaction item is authorized, the transaction item is included in a file in steps 417 and 431 so that the transaction item can be posted to the client's account. The file with posted entries may be filtered in step 419 according to the client's criteria for reporting to the client in step 429. Step 429 may apply to both credits and debits. An AR file may be credits, debits, specific SEC codes, and so forth, depending on what the client has set up in the file filter as the trap criteria.

If a transaction item is blocked, as determined by step 405, step 407 ascertains whether ACH Positive Pay feature 305 is activated for the client. If not, blocked transaction items are returned back to ACXIS system 300 in step 423 so that the blocked transaction items are not credited or debited to the client's account and are returned. However, if ACH Positive Pay feature 305 is activated, the blocked transaction items are paused in step 409 so that the items can be further processed to determine the treatment.

If the paused transaction item occurs after a cutoff time (e.g., 7 pm ET) as determined by step 411, the transaction item is returned to ACXIS system 300. Otherwise, the client can decide about the treatment of the transaction item in step 413. With some embodiments, ACH positive pay notifications may be generated for the client. The notifications may list new exceptions to be decisioned.

Transaction items may be reported as ACH Positive Pay exceptions for different reasons, including the trading partner has not been previously authorized, the trading partner is authorized but the transaction does not meet other authorization criteria (e.g., the maximum amount was exceeded, or the amount was not exact), and the trading partner may have switched banks or changed their Company ID numbers. Authorized users can resolve exceptions by instructing the bank to either pay (corresponding to step 415) or return the item (corresponding to step 421).

The client may configure ACH Positive Pay feature 305 to add, change and delete authorizations on-line. Authorizations are built with the Company ID information as it appears on the ACH transaction received from the client's trading partner. If the authorization criteria do not match exactly, the transaction is suspended when received and considered as an exception.

In addition to the Company ID information, the client may indicate criteria regarding the authorization amount. The client may indicate an exact amount, a maximum amount or all amounts. Authorizations are typically established by account. With some embodiments, there are two ways to add authorizations to an account. First, the client provides information prior to receiving transactions from the trading partner. Alternatively, authorizations may be added by performing maintenance when an exception has occurred.

If an authorization for a trading partner has not been established for an account and a transaction from that company is received, this transaction appears as an exception. When decisioning the exception, the client has the opportunity to add an authorization. By doing so, all future transactions from this trading partner that meet the authorization criteria are processed without further decisioning.

The client may also edit existing authorizations when trading partner information changes. Consequently, the client can change a company ID if the trading partner changes the company ID or can change or a maximum amount for a transaction for the trading partner. The client can delete the authorization record when the client has terminated a business relationship with a trading partner.

FIG. 5 shows flow diagram 500 for ACH Positive Pay feature 305 with dual authorization in accordance with an aspect of the invention. Flow diagram 500 corresponds to feature 305 with the dual authorization for paused transactions, where steps 501, 503, 505, 507, 509, 511, 513, 515, 517, 519, 521, 523, 529, and 531 correspond to steps 401, 403, 405, 407, 409, 411, 413, 415, 417, 419, 421, 423, 429, and 431, respectively, as shown in FIG. 4.

In addition, process 500 enables company administrators to have the option of selecting the dual authorization feature for the decision exceptions activity. When dual authorization is selected with ACH Positive Pay feature 305, exceptions require a secondary approval by an entitled user prior to being processed. If an exception decision is not approved (corresponding to steps 525 and 527), the transaction will be returned to step 513.

If the client has established dual authorization of decisioning exceptions, the approval task must be completed by an authorized approver prior to the deadline in order for processing to occur. Otherwise, the exception will be returned. Dual authorization of exceptions means that once an exception has been decisioned by a user, additional approval is required from a different user.

Figure 7:
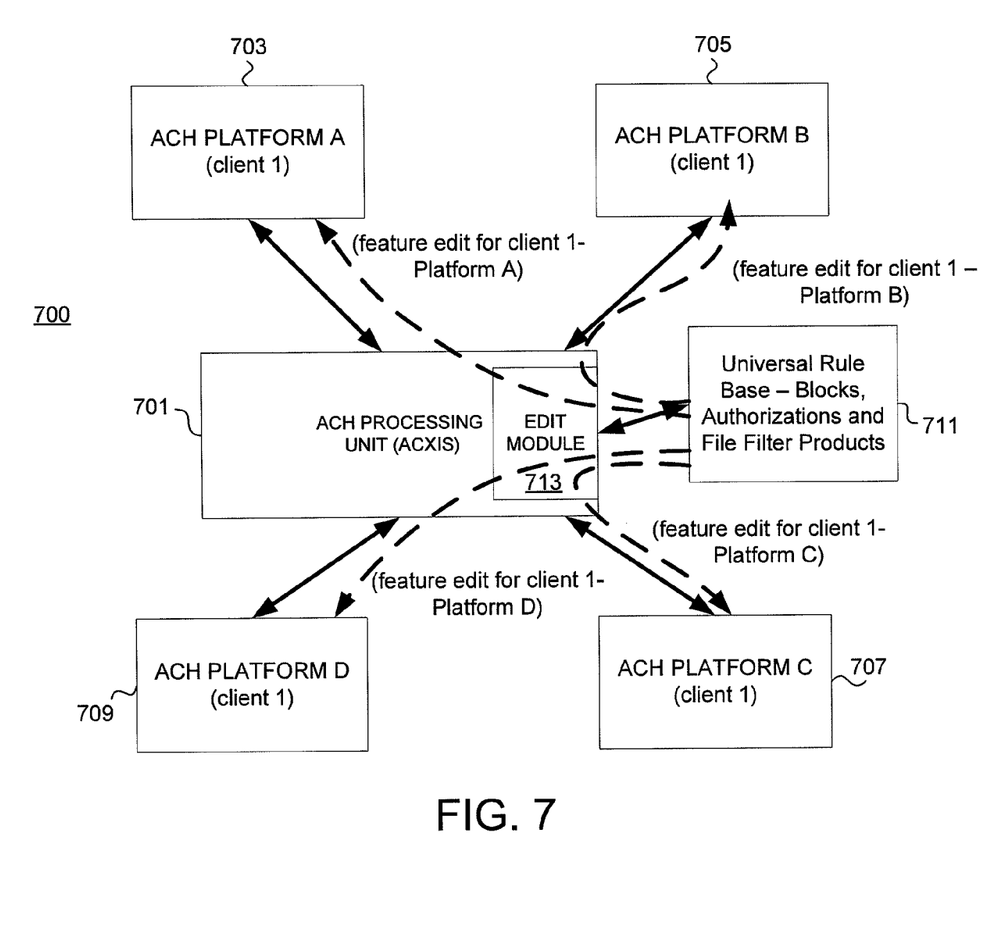
FIG. 7 shows a block diagram of an ACH system with multiple platforms for clients with accounts only on one platform in accordance with an aspect of the invention.

FIGS. 6 and 7 show ACH systems 600 and 700, respectively. FIG. 6 shows a block diagram of an ACH system 600 with multiple platforms in accordance with an aspect of the invention. ACH system 600 includes ACH processing unit 601, configuration interface 611, and a plurality of platforms 603, 605, 607, and 609, which correspond to ACH processing unit 701, interface 711, and platforms 703, 705, 707, and 709, respectively. ACH systems 600 and 700 may be implemented on system 100 or system 200 as shown in FIGS. 1 and 2, respectively.

Each platform is associated with client accounts based on at least one account criterion such as the client's geographical location. For example, a client located in California may be supported by ACH platform 609 while another client located in Texas may be supported by ACH platform 607. However, a client may have accounts on multiple platforms (e.g., platforms 703, 705, 707, and 709 as shown in FIG. 7) because, for example, the client may be located in multiple geographical regions.

A banking associate configures ACH features for a client through interface 611, which supports universal editing across all to the platforms. However, the banking associate does not need to know the platform(s) that are associated with the client when entering configuration data. ACH configuration data may differ among the different ACH platforms. For example, the account number may vary based on the size of the account number, non-permitted account numbers, and the account number format. Edit module 613 appropriately edits the account number for the designated platform so that a banking associate is not burdened with this task while entering account information through interface 611.

Figure 8:
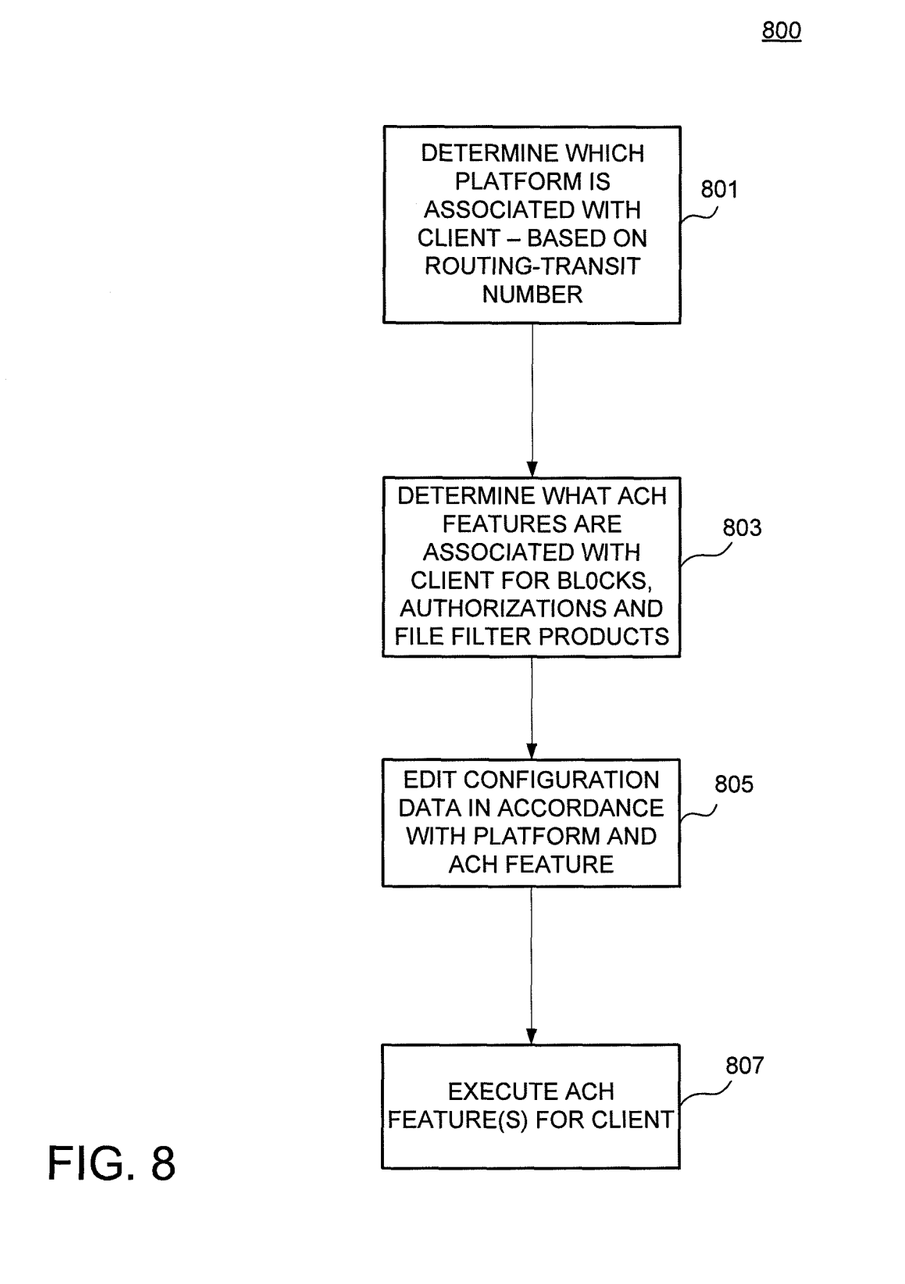
FIG. 8 shows a flow diagram for editing ACH configuration data in accordance with an aspect of the invention.

FIG. 8 shows flow diagram 800 for editing ACH configuration data in accordance with an aspect of the invention. In step 801, ACXIS system 300 determines which platform is associated a client based on a routing transit number. In step 803, ACXIS processing unit 601 or 701 determines what ACH features are associated with the client for Blocks, Authorizations, and File Filter products based on configuration data received from the banking associate through interface 611 or 711.

In step 805, configuration data may be edited by edit module 613 or 713 based on the associated platform for the client. When the desired ACH features have been configured for the client, the configured ACH feature commences processing transaction items for the client in step 807.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. A computer-assisted method comprising:
   receiving, by a computer system, a first user input from a user, said first user input comprising an instruction to block a transaction item for an account that is associated with an automated clearing house (ACH) system, wherein the instruction to block the transaction item comprises one of: an instruction to block all credits; an instruction to block all debits; an instruction to block all credits and all debits; an instruction to block all items originating from one or more Securities and Exchange Commission (SEC) codes; or an instruction to block all items originating from one or more trading partners;
   blocking the transaction item by the computer system according to the first user input;
   pausing a transaction associated with the transaction item by populating a first variable in memory of the computer system that indicates the transaction should be paused;
   presenting, by the computer system, the transaction item on an output device viewable by the user;
   receiving, by the computer system, a second user input from the user, said second user input comprising an indication of a desired handling of the transaction;
   when the indication is indicative of accepting the paused transaction item, allowing the transaction to process by populating a second variable in the memory to indicate to the computer system to allow the transaction item; and
   when the indication is indicative of returning the paused transaction item, stopping the transaction and returning the transaction item by populating a third variable in the memory to indicate to the computer system to stop the transaction and to return the transaction item.

2. The method of claim 1, further comprising:
   in response to the presenting, receiving on-line authorization maintenance information; and
   determining whether to block a subsequent item based on the on-line authorization maintenance information.

3. The method of claim 2, wherein the receiving the on-line authorization maintenance information comprises:
   editing a current authorization entry, wherein at least one non-monetary authorization criterion is modified.

4. The method of claim 2, wherein the receiving the on-line authorization maintenance information comprises:
   creating a new authorization entry for a trading partner, wherein the subsequent item is accepted based on the new authorization entry.

5. The method of claim 1, wherein the transaction comprises a credit.

6. The method of claim 1, wherein the transaction comprises a debit.

7. The method if claim 1, wherein the indication is determined by an employee of a client.

8. The method of claim 1, wherein the indication requires approval by a second employee of a client after a decision by a first employee of the client.

9. The method of claim 1, wherein the presenting occurs before a cutoff time.

10. The method of claim 1, further comprising:
    when the pausing occurs after a cutoff time, returning the transaction item.

11. A computer-readable medium having computer-executable instructions that when executed cause one or more processors in a computer system to perform steps of:
    when a transaction item is blocked for an account, pausing a transaction associated with the transaction item in an automated clearing house (ACH) system;
    presenting the transaction item;
    receiving an on-line indication regarding the disposition of the transaction;
    in response to the presenting, receiving on-line authorization maintenance information; and
    determining whether to block a subsequent item based on the on-line authorization maintenance information.

12. The computer medium of claim 11, wherein the instructions further perform:
    when the on-line indication is indicative of accepting the transaction item, allowing the transaction to process; and
    when the on-line indication is indicative of returning the transaction item, stopping the transaction and returning the transaction item.

13. The computer medium of claim 11, wherein the instructions further perform:
    editing a current authorization entry, wherein at least one non-monetary authorization criterion is modified.

14. The computer medium of claim 11, wherein the instructions further perform:
    creating a new authorization entry for a trading partner, wherein the subsequent item is accepted based on the new authorization entry.

15. The computer medium of claim 11, wherein the on-line indication is determined by an employee of a client.

16. The computer medium of claim 11, wherein the on-line indication requires approval by a second employee of a client after a decision by a first employee of the client.

17. The computer medium of claim 11, wherein the presenting occurs before a cutoff time.

18. The computer medium of claim 11, wherein the instructions further perform:
    when the pausing occurs after a cutoff time, returning the transaction item.

19. An apparatus in an automated clearing house (ACH) system comprising:
    a memory; and
    one or more processors coupled to the memory and configured to perform, based on instructions stored in the memory:

receiving a first user input from a user, said first user input comprising an instruction to block a transaction item for an account that is associated with an ACH feature, wherein the instruction to block the transaction item comprises one of: an instruction to block all credits; an instruction to block all debits; an instruction to block all credits and all debits; an instruction to block all items originating from one or more Securities and Exchange Commission (SEC) codes; or an instruction to block all items originating from one or more trading partners;

blocking the transaction item according to the first user input;

pausing a transaction associated with the transaction item;

presenting the transaction item to the user;

receiving a second user input from the user, said second user input comprising an on-line indication regarding the disposition of the transaction;

when the on-line indication is indicative of accepting the paused transaction item, allowing the transaction to process; and when the on-line indication is indicative of returning the paused transaction item, stopping the transaction and returning the transaction item.

20. The apparatus of claim 19, wherein the instructions further cause the apparatus to:

in response to the presenting, receiving on-line authorization maintenance information; and determining whether to block a subsequent item based on the on-line authorization maintenance information.

21. The apparatus of claim 20, wherein the instructions further cause the apparatus to:

editing a current authorization entry, wherein at least one non-monetary authorization criterion is modified.

22. The apparatus of claim 20, wherein the instructions further cause the apparatus to:

creating a new authorization entry for a trading partner, wherein the subsequent entry is accepted based on the new authorization entry.

23. The apparatus of claim 19, wherein the on-line indication is determined by an employee of a client.

24. The apparatus of claim 19, wherein the on-line indication requires approval by a second employee of a client after a decision by a first employee of the client.

25. The apparatus of claim 19, wherein the presenting occurs before a cutoff time.

26. The apparatus of claim 19, wherein the instructions further cause the apparatus to:

when the pausing occurs after a cutoff time, returning the transaction item.

27. A computer-assisted method comprising:

receiving, by a computer system, a request to configure an automated clearing house (ACH) feature for a client on an ACH system;

determining, by the computer system, an assigned platform for the client based on at least one account criterion, wherein the ACH system comprises a plurality of ACH platforms; and editing, by the computer system, configuration data based on the assigned platform, wherein the edited configuration data differs for another of the plurality of ACH platforms.

28. The method of claim 27, wherein the configuration data comprises account identification information.

29. The method of claim 27, wherein all of the configuration data is obtained only through one input interface for the plurality of ACH platforms.

30. The method of claim 27, wherein the at least one account criterion includes a geographical location of the client.

31. A computer-readable medium having computer-executable instructions that when executed perform:

receiving a request to configure an automated clearing house (ACH) feature for a client on an ACH system;

determining an assigned platform for the client based on a geographical location of the client, wherein the ACH system comprises a plurality of ACH platforms; and editing configuration data based on the assigned platform, wherein the edited configuration data differs for another of the plurality of ACH platforms.

32. The computer-readable medium of claim 31, wherein the configuration data comprises account identification information.

33. The computer-readable medium of claim 31, wherein all of the configuration data is obtained only through one input interface for the plurality of ACH platforms.

34. An apparatus in an automated clearing house (ACH) system comprising:

a memory; and a processor coupled to the memory and configured to perform, based on instructions stored in the memory:

receiving a request to configure an automated clearing house (ACH) feature for a client on the ACH system;

determining an assigned platform for the client based on at least one account criterion, wherein the ACH system comprises a plurality of ACH platforms; and editing account identification information based on the assigned platform, wherein the edited configuration data differs for another of the plurality of ACH platforms.

35. The apparatus of claim 34, wherein the account identification information varies in format for at least two of the ACH platforms.

36. The apparatus of claim 34, wherein all configuration data for the ACH feature is obtained only through one input interface for the plurality of ACH platforms.

\* \* \* \* \*